(12) United States Patent
Miller

(10) Patent No.: US 8,521,878 B2
(45) Date of Patent: Aug. 27, 2013

(54) APPARATUS, SYSTEM, AND METHOD FOR PARALLELIZING ACCESS TO SHARED ASSETS

(75) Inventor: Justin Thomson Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1669 days.

(21) Appl. No.: 11/691,354

(22) Filed: Mar. 26, 2007

(65) Prior Publication Data

US 2008/0243522 A1    Oct. 2, 2008

(51) Int. Cl.
*G06Q 90/00*  (2006.01)
(52) U.S. Cl.
USPC ............................................ 709/226; 705/1.1
(58) Field of Classification Search
USPC ........................................................ 709/226
See application file for complete search history.

(56) References Cited

U.S. PATENT DOCUMENTS

| | | | | |
|---|---|---|---|---|
| 6,934,294 | B2 * | 8/2005 | Bertagna | 370/412 |
| 6,941,379 | B1 | 9/2005 | Dingsor et al. | 709/235 |
| 2002/0013864 | A1 | 1/2002 | Dandrea et al. | 710/6 |
| 2003/0182464 | A1 * | 9/2003 | Hamilton et al. | 709/314 |
| 2004/0120332 | A1 * | 6/2004 | Hendel | 370/411 |
| 2008/0013450 | A1 * | 1/2008 | Worley et al. | 370/230 |

* cited by examiner

*Primary Examiner* — Hussein Elchanti
*Assistant Examiner* — Maceeh Anwari
(74) *Attorney, Agent, or Firm* — Kunzler Law Group

(57) ABSTRACT

An apparatus, system, and method are disclosed for parallelizing access to shared assets. A size module determines if a size of a first spoke of a plurality of spokes is greater than a low threshold. The spokes are arranged in a circular order wherein a global spoke pointer identifies the first spoke as a current spoke. Each spoke is configured as an asset queue. A request module requests an asset from the first spoke if the size of the first spoke is greater than the low threshold. A rotate module rotates the global spoke pointer to a second spoke of the plurality of spokes if the size of the first spoke is not greater than the low threshold, wherein the second spoke becomes the current spoke.

20 Claims, 7 Drawing Sheets

APPARATUS, SYSTEM, AND METHOD FOR PARALLELIZING ACCESS TO SHARED ASSETS

BACKGROUND OF THE INVENTION

1. Field of the Invention

This invention relates to accessing assets and more particularly relates to parallelizing access to shared assets.

2. Description of the Related Art

Data processing systems include a plurality of assets such as servers, blade servers, pages of memory, storage devices, and the like. The assets of a data processing system may be shared among one or more processes executing on the data processing system. For example, a plurality of processes may share pages of memory.

The data processing system may allocate access to the shared assets so that all processes may acquire needed shared assets in a timely manner. As used herein, shared assets are referred to as assets. In addition, the data processing system must reduce interference between processes in acquiring assets.

Data processing systems have employed queues to allocate assets. A queue may include a data set such as a delimited entry in a file, a data structure in an array of linked data structures, a database entry, and the like. The data set may identify an asset. For example, a data set may include the address of a storage device asset.

Assets may be shared by unlinking or removing the data set for an asset from the queue and allocating the data set and the asset to a process. Similarly, assets may be returned to the queue by linking the data set for the asset to the queue. Queues may be organized as first-in/first-out queues, last-in/first-out queues, and the like.

Unfortunately, there may be a conflict between processes if more than one process attempts to concurrently acquire an asset from a queue. As a result, a queue may employ a queue lock wherein only a process that is granted the asset lock may access the queue. Other processes must wait until they are granted the queue lock before accessing the queue.

Queue locks effectively prevent interference between processes seeking to acquire assets. Unfortunately, the processes may wait a significant time in order to receive a queue lock. As a result, valuable processing time may be lost while the processes are idle.

SUMMARY OF THE INVENTION

From the foregoing discussion, there is a need for an apparatus, system, and method for parallelizing access to assets. Beneficially, such an apparatus, system, and method would reduce the time needed to acquire assets.

The present invention has been developed in response to the present state of the art, and in particular, in response to the problems and needs in the art that have not yet been fully solved by currently available systems for sharing assets. Accordingly, the present invention has been developed to provide an apparatus, system, and method for parallelizing access to assets that overcome many or all of the above-discussed shortcomings in the art.

The apparatus to parallelize access to assets is provided with a plurality of modules configured to functionally execute the steps of determining if a size of a first spoke is greater than a low threshold, requesting an asset, and rotating a global spoke pointer. These modules in the described embodiments include a size module, a request module and a rotate module.

The size module determines if a size of a first spoke of a plurality of spokes is greater than a low threshold. The spokes are arranged in a circular order wherein a global spoke pointer identifies the first spoke as a current spoke. Each spoke is configured as an asset queue.

The request module requests an asset from the first spoke if the size of the first spoke is greater than the low threshold. The rotate module rotates the global spoke pointer to a second spoke of the plurality of spokes if the size of the first spoke is not greater than the low threshold, wherein the second spoke becomes the current spoke.

In one embodiment, the rotate module is further configured to rotate the global spoke pointer to the second spoke if a spoke lock for the first spoke is not granted. Alternately, a rotation count module may determine if a number of global spoke pointer rotations exceeds a rotation threshold and if a size of the current spoke is not empty so that the request module is configured to request an asset from the current spoke.

In another embodiment, the apparatus also includes an error module and an empty count module. If the number of global spoke pointer rotations exceeds the rotation threshold and the current spoke is empty, the error module is configured to communicate an error condition if the empty count module determines a number of empty spokes exceeds an empty threshold. The rotate module is configured to rotate the global spoke pointer if the empty count module determines the number of empty spokes does not exceed the empty threshold.

In an alternate embodiment, the size module determines if the size of the first spoke is less than a high threshold. The request module requests adding the asset to the first spoke if the size of the first spoke is less than the high threshold. The rotate module rotates the global spoke pointer to the second spoke if the size of the first spoke is not less than the high threshold. Alternatively the rotate module rotates the global spoke pointer and the request module requests adding the asset to the current spoke if a number of global spoke pointer rotations exceeds the rotation threshold. The apparatus parallelizes access to the assets, facilitating rapid asset grants.

A system of the present invention is also presented to parallelize access to shared assets. The system may be embodied in a data processing system. In particular, the system, in one embodiment, includes a plurality of assets and a computer. The computer stores a data set corresponding to each asset. Each data set is associated with one spoke of a plurality of spokes organized with a circular order and each spoke is configured as an asset queue. The computer includes a size module, a request module and a rotate module.

The assets may be configured as pages of shared memory. In an alternate embodiment, the assets are selected from processors, blade servers, storage devices and communication channels.

The size module determines if the size of a first spoke of a plurality of spokes is greater than a low threshold. The spokes are arranged in a circular order wherein a global spoke pointer identifies the first spoke as a current spoke. Each spoke is configured as an asset queue.

The request module requests an asset from the first spoke if a size of the first spoke is greater than the low threshold. The rotate module rotates the global spoke pointer to a second spoke of the plurality of spokes if the size of the first spoke is not greater than the low threshold, wherein the second spoke becomes the current spoke. The system parallelizes access to assets so that assets may be utilized more efficiently.

A method of the present invention is also presented for parallelizing access to shared assets. The method in the disclosed embodiments substantially includes the steps to carry out the functions presented above with respect to the operation of the described apparatus and system. In one embodiment, the method includes determining if a size of a first spoke is greater than a low threshold, requesting an asset, and rotating a global spoke pointer.

A size module determines if a size of a first spoke of a plurality of spokes is greater than a low threshold. The spokes are arranged in a circular order wherein a global spoke pointer identifies the first spoke as a current spoke. Each spoke is configured as an asset queue.

A request module requests an asset from the first spoke if the size of the first spoke is greater than the low threshold. A rotate module rotates the global spoke pointer to a second spoke of a plurality of spokes if the size of the first spoke is not greater than the low threshold wherein the second spoke becomes the current spoke.

In an alternate embodiment the global spoke pointer is rotated to the second spoke if a spoke lock for the first spoke is not granted. The request module requests an asset from the current spoke if a number of global spoke pointer rotations exceeds a rotation threshold and if a size of a current spoke is not empty. The method parallelizes access to the assets, enabling efficient asset allocation.

References throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention parallelizes access to assets. In addition, the present invention may reduce delays for processes needing to access asset queues. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
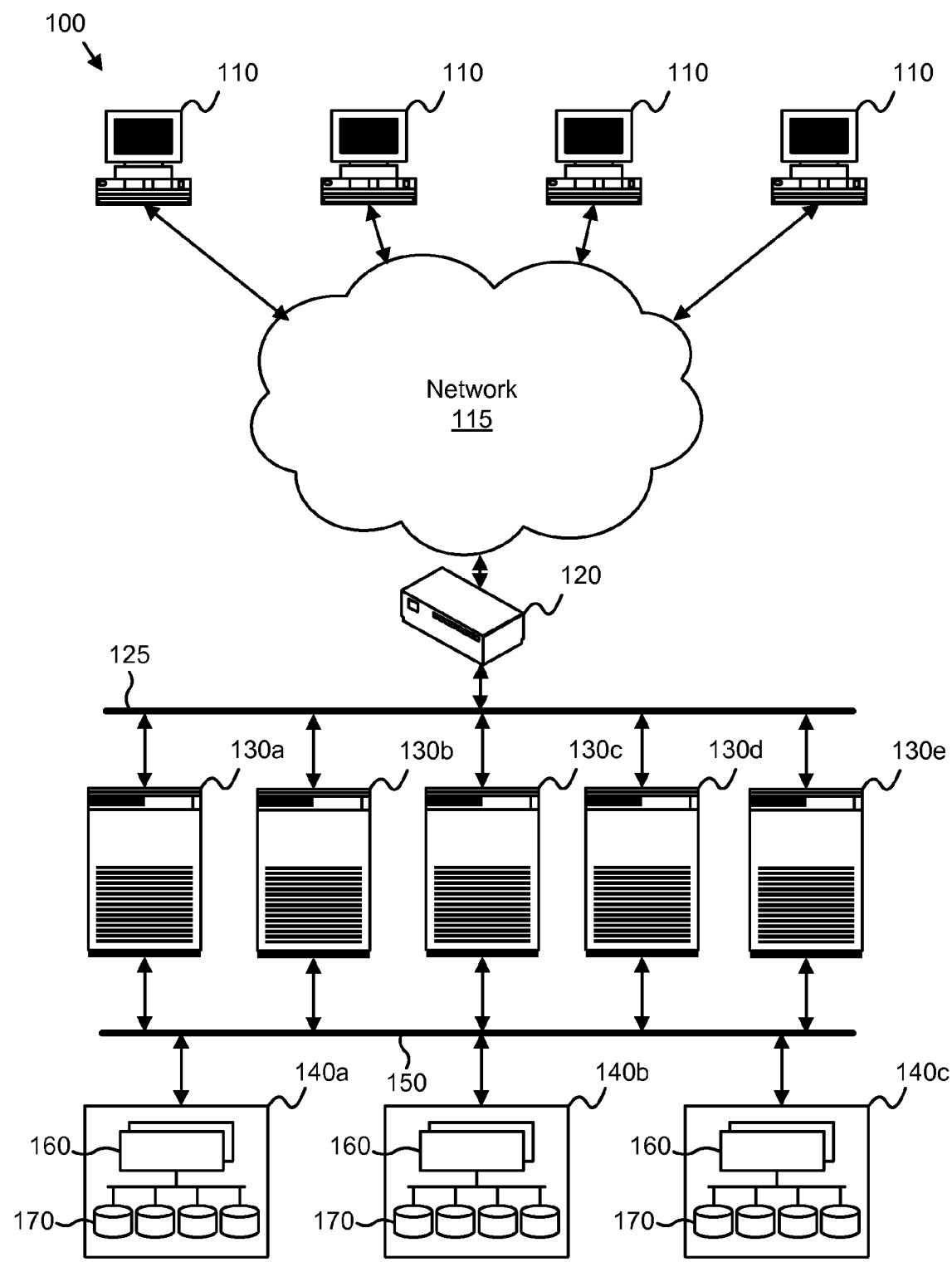
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, micromechanical storage devices, holographic storage devices, and semiconductor storage devices.

In one embodiment, the DPS 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110. In one embodiment, the server 130 may execute a database application used by the client 110 to access the data.

The data processing system 100 enables the multiple clients 110 to access assets such as free pages of shared memory storage systems without interfering with each other. The assets may be configured as pages of shared memory. In an alternate embodiment, the assets are selected from processors, blade servers, storage devices and communication channels.

Figure 2:
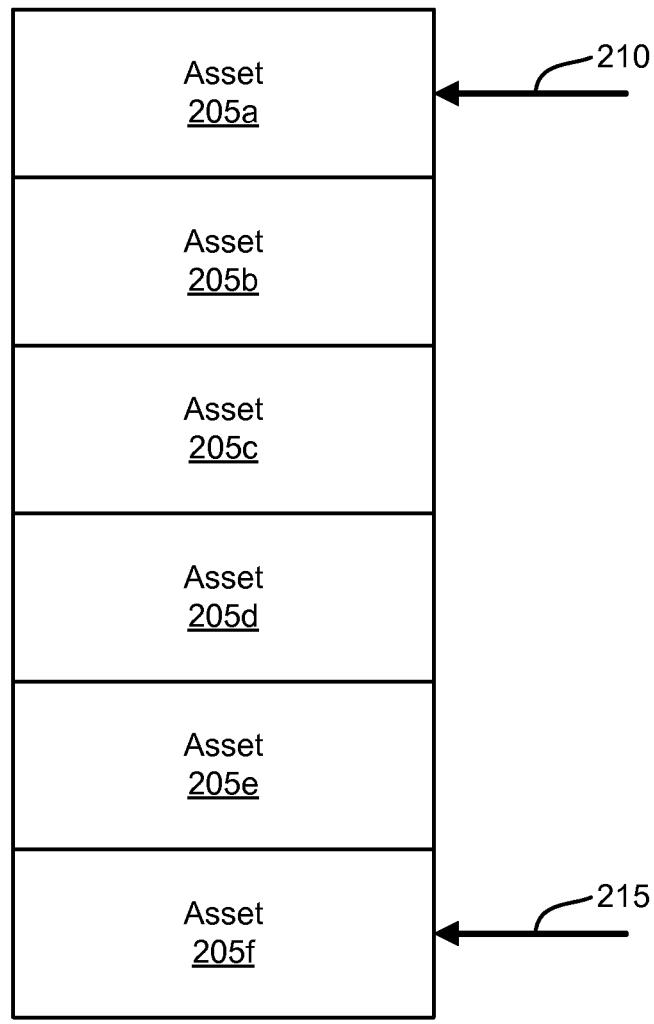
FIG. 2 is a schematic block diagram illustrating one embodiment of an asset spoke of the present invention.

FIG. 2 is a schematic block diagram illustrating one embodiment of an asset spoke 200 of the present invention. The asset spoke 200 includes one or more assets 205, a size counter 220, and a spoke lock 225. The size counter 220 counts the number of assets 205 in the asset spoke 200. In one embodiment, the asset spoke 200 begins with a start pointer 210 and ends with end pointer 215. The assets 205 may be linked using pointers as is well known to those of skill in the art. The spoke lock 225 is granted to a client 110 so that no other client 110 can access the asset spoke 200, protecting the asset spoke 200 and the size counter 220 from corruption by another process.

The size counter 220 and the spoke lock 225 ensure that asset spoke 200 homogeneity is maintained. Access to the assets 205 stored in the asset spoke 200 may follow a first-in-first-out or a last-in-first-out rule. As is known to one skilled in the art, first-in-first-out denotes that the first asset 205 to be added to the asset spoke 200 will be the first asset 205 to be removed. Similarly last-in-first-out denotes that the last asset 205 to be added to the structure will be the first asset 205 to be removed. The asset spoke 200 may be implemented as a singly or doubly linked list, but any data structure that can contain a collection of assets and enable the client 110 to add or remove objects from the collection would suffice.

Figure 3:
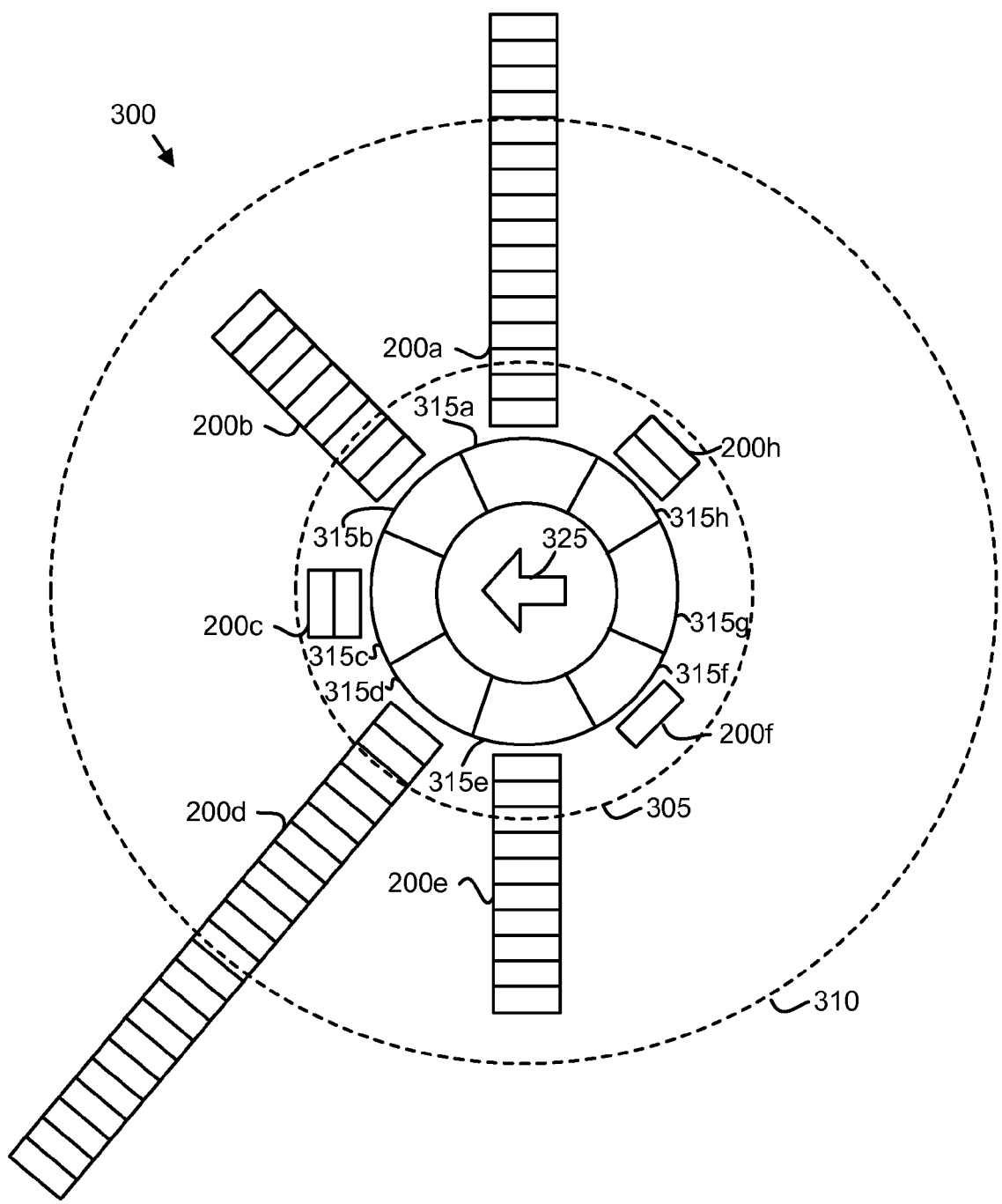
FIG. 3 is a schematic block diagram illustrating one embodiment of a spoke structure of the present invention.

FIG. 3 is a schematic block diagram illustrating one embodiment of a spoke structure 300 of the present invention. In a certain embodiment, the spoke structure 300 is organized as one or more data structures stored on a server 130 of FIG. 1. The spoke structure 300 includes one or more asset spokes 200, one or more addresses 315 for the spokes 200, a low threshold 305, and a high threshold 310. The description of the spoke structure 300 refers to elements of FIGS. 1-2, like numbers referring to like elements.

The addresses 315 may provide away to access the spokes 200. Each address 315 may be an address pointed to by a start pointer 210. The spoke structure 300 also includes a global spoke pointer 325 that points to a current spoke and that rotates through the spokes 200 as objects are allocated and deallocated from each spoke 200. The global spoke pointer 325 may be an index to an array containing the spokes 200, a pointer to the start pointer 210 of a spoke 200, or the like.

The low and high thresholds 305, 310 specify a desired range for the number of assets 205 of each spoke 200. The number of assets 205 is referred to herein as the size of the spokes 200. The low and high thresholds 305, 310 may be fixed throughout the life of a spoke 200 or may change dynamically.

Figure 4:
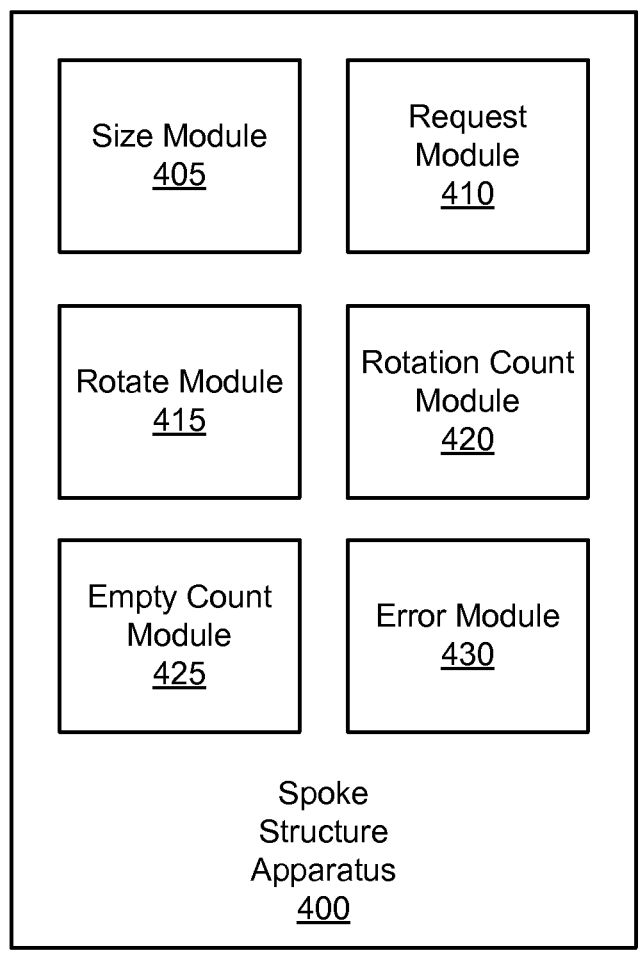
FIG. 4 is a schematic block diagram illustrating one embodiment of a spoke structure apparatus of the present invention.

FIG. 4 is a schematic block diagram illustrating one embodiment of a spoke structure apparatus 400 of the present invention. In a certain embodiment the spoke structure apparatus 400 is organized as one or more computer program products executing on a server 130 of FIG. 1. The spoke structure apparatus 400 includes a size module 405, a request module 410, and a rotate module 415. The description of the spoke structure apparatus 400 refers to elements of FIGS. 1, 2 and 3, like numbers referring to like elements. The size module 405 determines if the size of the first spoke 200a of the plurality of spokes 200 is greater than the low threshold 305.

The request module 410 requests an asset 205 from the first spoke 200a if the size of the first spoke 200a is greater than the low threshold 305. The rotate module 415 rotates the global spoke pointer 325 to a second spoke 200b of the plurality of spokes 200 if the size of the first spoke 200a is not greater than the low threshold 305, wherein the second spoke 200b becomes the current spoke.

In one embodiment, the rotate module 415 is further configured to rotate the global spoke pointer 325 to the second spoke 200b if a spoke lock for the first spoke 200a is not granted. Alternately, a rotation count module 420 may determine if a number of global spoke pointer rotations exceeds a rotation threshold and if a size of the current spoke is not empty so that the request module 410 is configured to request an asset 205 from the current spoke.

In another embodiment, the apparatus 400 also includes an error module 430 and an empty count module 425. If the number of global spoke pointer rotations exceeds the rotation threshold and the current spoke is empty, the error module 430 is configured to communicate an error condition if the empty count module 425 determines a number of empty spokes 200 exceeds an empty threshold. The rotate module 415 is configured to rotate the global spoke pointer 325 if the empty count module 425 determines the number of empty spokes 200 does not exceed the empty threshold.

In an alternate embodiment, the size module 405 determines if the size of the first spoke 200a is less than a high threshold 310. The request module 410 requests adding the asset 205 to the first spoke 200a if the size of the first spoke 200a is less than the high threshold 310. The rotate module 415 rotates the global spoke pointer 325 to the second spoke 200b if the size of the first spoke 200a is not less than the high threshold 310. Alternatively the rotate module 415 rotates the global spoke pointer 325 and the request module 410 requests adding the asset to the current spoke if a number of global spoke pointer rotations exceeds the rotation threshold.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method.

Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
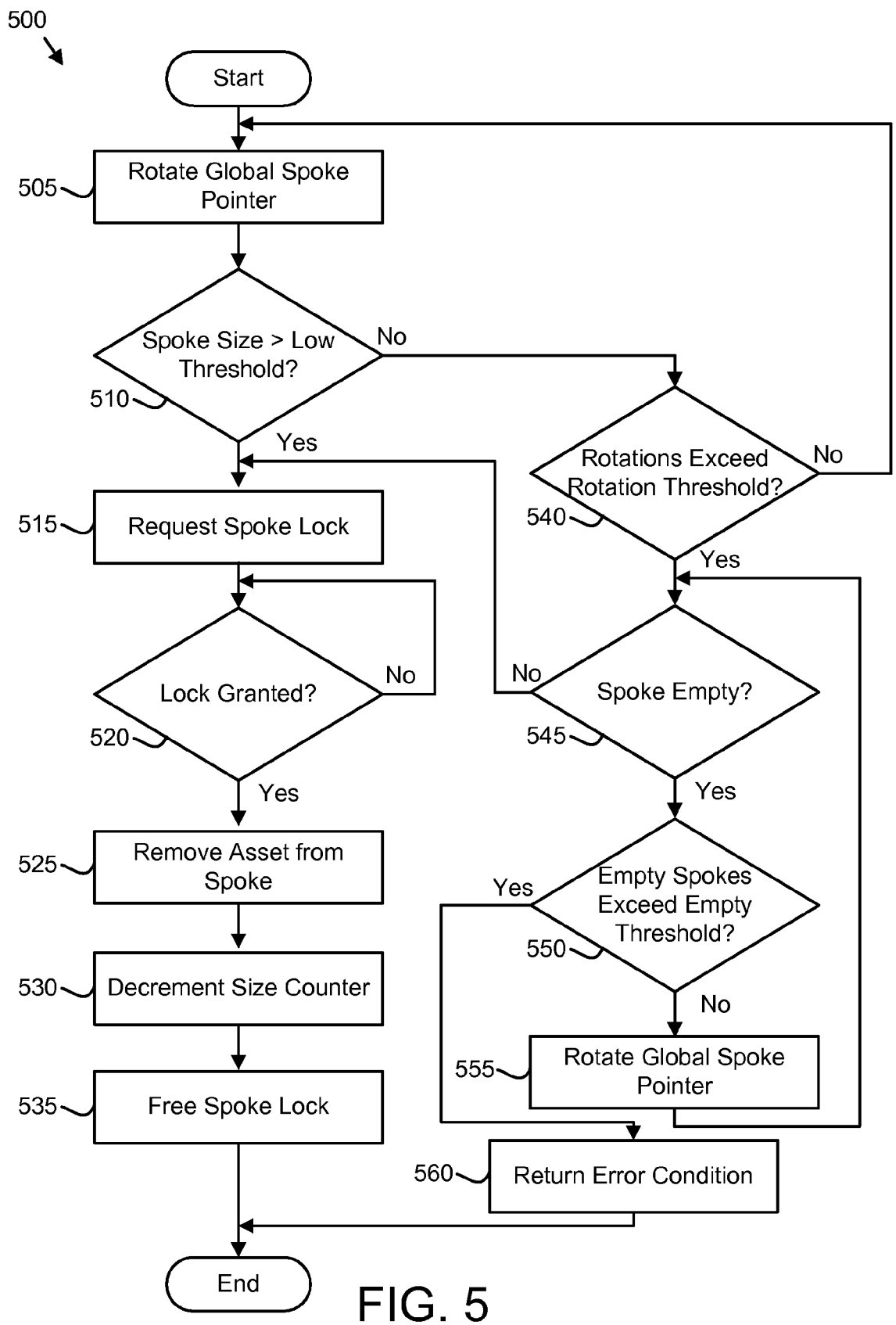
FIG. 5 is a schematic flow chart diagram illustrating one embodiment of an asset grant method of the present invention.

FIG. 5 is a schematic flow chart diagram illustrating one embodiment of an asset grant method 500 of the present invention. The method 500 substantially includes the steps to carry out the functions described above with respect to the operation of the described apparatus in FIGS. 1-4. The description of the method 500 refers to elements of FIGS. 1-4, like numbers referring to like elements. The method 500 begins and the rotate module 415 rotates 505 the global spoke pointer 325 to the next spoke 200 of the plurality of spokes 200. The next spoke 200 may be the first spoke 200a.

The size module 405 determines 510 if the size of the first spoke 200a of the plurality of spokes 200 is greater than the low threshold 305, wherein the first spoke 200a is the current spoke. In the embodiment shown in FIG. 3, the size of the second spoke 200b is greater than the low threshold 305. In an alternate example, the size module 405 may determine 510 that the size of an eighth spoke 200h of FIG. 3 is not greater than the low threshold 305. If the size of the spoke 200 is greater than the low threshold 305, the request module 410 requests 515 the spoke lock 225. The request module 410 further determines 520 if the spoke lock 225 is granted.

If the spoke lock 225 is granted 520, the client 110 removes 525 the asset 205 from the spoke 200, the spoke's size counter 220 is decremented 530, and the spoke lock 225 is released 535. In one embodiment, if the size of the spoke 200 is less than or equal to the low threshold 305, then the rotation count module 420 may determine 540 if a number of global spoke pointer 325 rotations exceeds a rotation threshold. For example as shown in the embodiment in FIG. 3, the size of a third spoke 200c is less than the low threshold 305 so that the rotation count module 420 may determine 540 if a number of global spoke pointer rotations exceed a rotation threshold. The rotation threshold may be a specified number of rotations such as six (6).

If the number of rotations exceeds the rotation threshold, the size module 405 determines 545 if the current spoke is empty. If the current spoke is not empty, the request module 410 requests 515 the spoke lock 225. If the size module 405 determines 545 that the current spoke is empty, the empty count module 425 determines 550 if a number of empty spokes 200 exceed the empty threshold. The empty threshold may be a specified number of empty spokes 200 such as two (2).

If the number of empty spokes 200 exceeds the empty threshold, the error module 430 returns 560 an error condition. For example, if three consecutive spokes 200 are empty so that the empty threshold is exceeded, the error module 560 communicates an "asset unavailable" error condition. If the number of spokes 200 does not exceed the empty threshold, the rotate module 415 rotates 555 the global spoke pointer 325 to check the next spoke 200 and the empty count module 425 determines 545 if the new current spoke is empty. The method 500 allocates assets, allowing a client 110 to move to another spoke 200 if a current spoke does not have sufficient assets.

Figure 6:
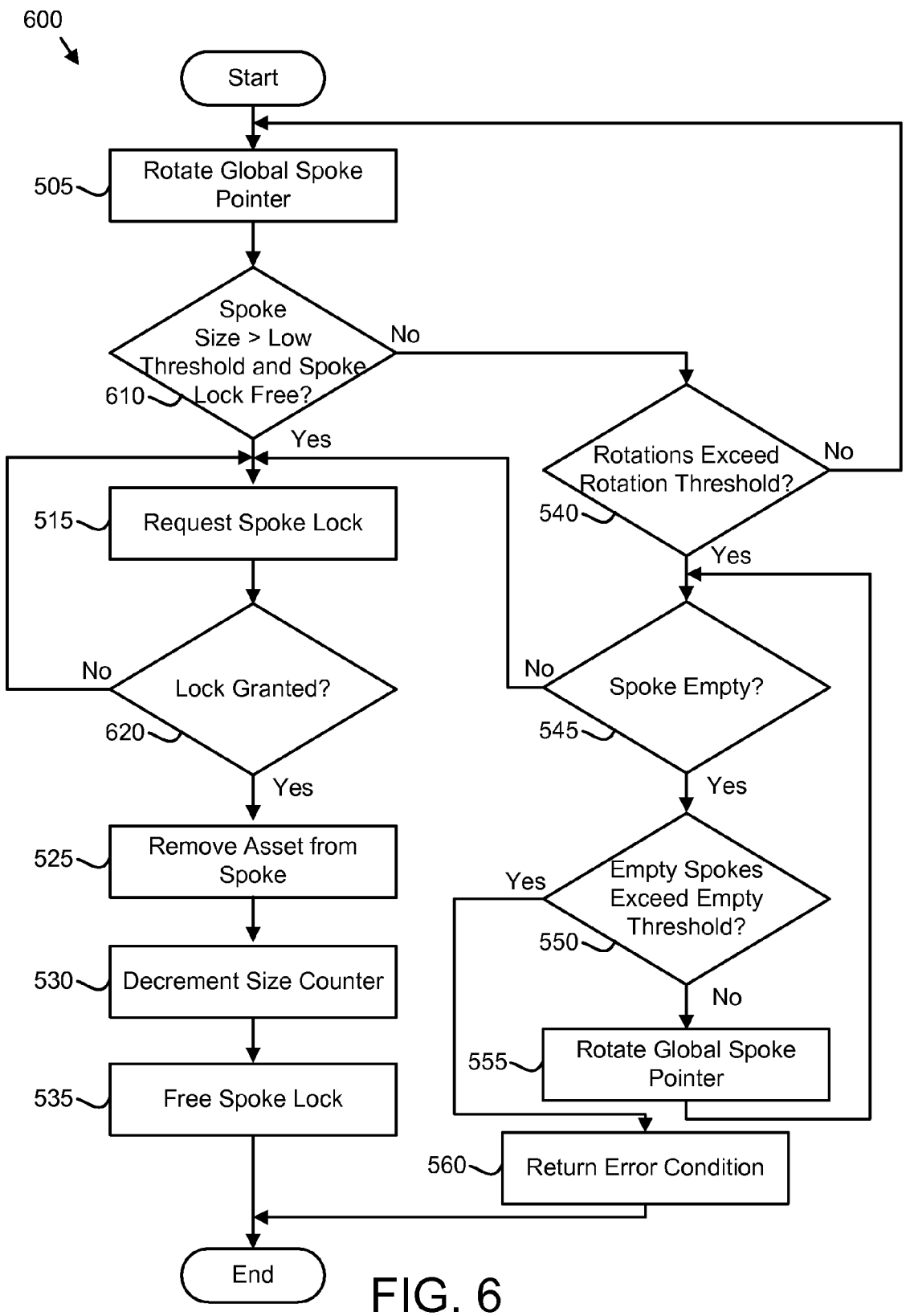
FIG. 6 is a schematic flow chart diagram illustrating one alternate embodiment of an asset grant method of the present invention.

FIG. 6 is a schematic flow chart diagram illustrating one alternate embodiment of an asset grant method 600 of the present invention. The asset grant method 600 is the same as the asset grant method 500 of FIG. 5 except that the step 510 is replaced by step 610, which determines 610 if the spoke size is greater than the low threshold 305 and the spoke lock 225 is free. Thus if the spoke size is greater than the low threshold 305, but the spoke lock 225 is not free, the rotation count module 420 may determine 540 if a number of global spoke pointer 325 rotations exceeds a rotation threshold 540.

In addition, in step 520 of FIG. 5 the request module 410 determines 520 if the spoke lock 225 is granted and if the spoke lock 225 is not granted the request module 410 waits for the spoke lock 225. Whereas in step 620 of FIG. 6, the request module 410 determines 620 if the spoke lock 225 is granted and if the spoke lock 225 is not granted, the request module 410 requests 515 the spoke lock 225. The method 600 allocates assets, allowing a client 110 to move to another spoke 200 if a spoke lock 225 is not available for a current spoke.

Figure 7:
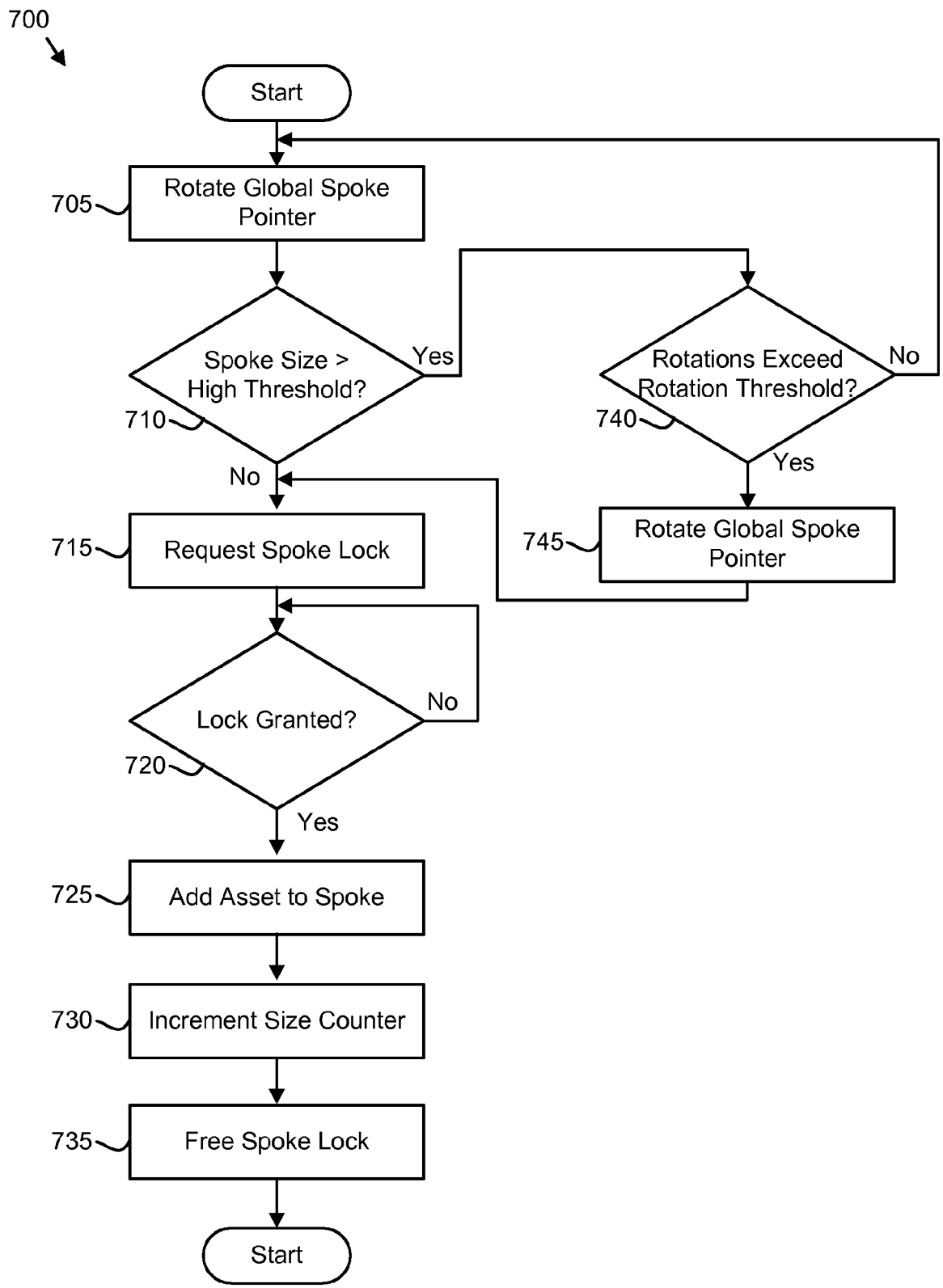
FIG. 7 is a schematic flow chart diagram illustrating one embodiment of an asset return method of the present invention.

FIG. 7 is a schematic flow chart diagram illustrating one embodiment of an asset return method 700 of the present invention. The method 700 substantially includes the steps to carry out the functions described above with respect to the operation of the described apparatus in FIGS. 1-4. The description of the method 700 refers to elements of FIGS. 1-6, like numbers referring to like elements. The method 700 begins and the rotate module 415 rotates 705 the global spoke pointer 325 to the next spoke 200 of the plurality of spokes 200. The next spoke 200 may be the first spoke 200a.

The size module 405 determines 710 if the size of the first spoke 200a of the plurality of spokes 200 is greater than the high threshold 310. In the embodiment shown in FIG. 3, the size of the first spoke 200a is greater than the high threshold 310. Alternatively, the size of the second spoke 200b is not greater than the high threshold 310. If the size of the spoke 200 is not greater than the high threshold 310, the request module 410 requests 715 the spoke lock 225. The request module 410 further determines 720 if the spoke lock 225 is granted.

If the spoke lock 225 is granted, the client 110 adds 725 the asset 205 to the spoke 200, the spoke's size counter 220 is incremented 730 and the spoke lock 225 is released 735. In one embodiment, if the size of the spoke 200 is greater than the high threshold 310, the rotation count module 420 may determine 740 if a number of global spoke pointer rotations exceeds a rotation threshold. For example, in the embodiment in FIG. 3, the second spoke 200b is greater than the high threshold 310 so that the rotation count module 420 may determine 740 if the number of global spoke pointer rotations exceed a rotation threshold.

If the number of global spoke pointer rotations does not exceed the rotation threshold, the rotate module 415 rotates 705 the spoke pointer 325 to check the next spoke 200. If the number of global spoke pointer rotations exceeds the rotation threshold 740, the rotate module 415 rotates 745 the global spoke pointer 325 and the request module 410 requests 715 spoke lock 225. The method 700 returns assets 205 to spokes 200, selecting an alternate spoke 200 if a first spoke 220*a* has more than a specified number of assets 205.

The embodiment of the present invention parallelizes access to assets 205. In addition, the present invention may reduce delays for clients needing to access asset queues. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to parallelize access to assets, the apparatus comprising:
   a non-transitory storage device storing executable code;
   a processor executing the executable code, the executable code comprising:
     a size module determining if a size of a first spoke of a plurality of spokes organized with a circular order is greater than a low threshold, wherein a global spoke pointer identifies the first spoke as a current spoke, the global spoke pointer rotates through the plurality of spokes in a fixed, circular order from the first spoke to a second spoke and each of the other plurality of spokes and then back to the first spoke, wherein the plurality of spokes maintain fixed positions in the circular order and each spoke is an asset queue;
     a request module requesting an asset from the first spoke if the size of the first spoke is greater than the low threshold; and
     a rotate module rotating the global spoke pointer to the second spoke of the plurality of spokes if the size of the first spoke is not greater than the low threshold, wherein the second spoke becomes the current spoke.

2. The apparatus of claim 1, the rotate module further rotating the global spoke pointer to the second spoke if the size of the first spoke is greater than the low threshold and if a spoke lock for the first spoke is not granted in response to the request.

3. The apparatus of claim 1, the apparatus further comprising a rotation count module and the request module further requesting an asset from the current spoke if the rotation count module determines a number of global spoke pointer rotations exceeds a rotation threshold and if a size of the current spoke is not empty.

4. The apparatus of claim 3, further comprising an error module and an empty count module and wherein if the number of global spoke pointer rotations exceeds the rotation threshold and the current spoke is empty, the error module communicates an error condition if the empty count module determines a number of empty spokes exceeds an empty threshold and the rotate module rotates the global spoke pointer if the empty count module determines the number of empty spokes does not exceed the empty threshold.

5. The apparatus of claim 1, wherein:
   the size module determines if the size of the first spoke is less than a high threshold;
   the request module requests adding the asset to the first spoke if the size of the first spoke is less than the high threshold; and
   the rotate module rotates the global spoke pointer to the second spoke if the size of the first spoke is not less than the high threshold.

6. The apparatus of claim 5, wherein the rotate module rotates the global spoke pointer and the request module requests adding the asset to the new current spoke if a number of global spoke pointer rotations exceeds a rotation threshold.

7. A computer program product comprising a non-transitory computer useable medium having a computer readable program, wherein the computer readable program when executed on a computer causes the computer to:
   determine if a size of a first spoke of a plurality of spokes organized with a circular order is greater than a low threshold, wherein a global spoke pointer identifies the first spoke as a current spoke, the global spoke pointer rotates through the plurality of spokes in a fixed, circular order from the first spoke to a second spoke and each of the other plurality of spokes and then back to the first spoke, wherein the plurality of spokes maintain fixed positions in the circular order and each spoke is an asset queue;
   request an asset from the first spoke if the size of the first spoke is greater than the low threshold; and
   rotate the global spoke pointer to the second spoke of the plurality of spokes if the size of the first spoke is not greater than the low threshold, wherein the second spoke becomes the current spoke.

8. The computer program product of claim 7, wherein the computer readable program further causes the computer to rotate the global spoke pointer to the second spoke if the size of the first spoke is greater than the low threshold and if a spoke lock for the first spoke is not granted in response to the request.

9. The computer program product of claim 7, wherein the computer readable program further causes the computer to request an asset from the current spoke if a number of global spoke pointer rotations exceeds a rotation threshold and if a size of the current spoke is not empty.

10. The computer program product of claim 9, wherein if the number of global spoke pointer rotations exceeds the rotation threshold and the current spoke is empty, the computer readable program further causes the computer to:
    communicate an error condition if a number of empty spokes exceeds an empty threshold; and
    rotate the global spoke pointer if the number of empty spokes does not exceed the empty threshold.

11. The computer program product of claim 7, wherein the computer readable program further causes the computer to:
    remove the asset from the first spoke when a spoke lock for the first spoke is granted;
    decrement a size counter for the first spoke; and
    free the spoke lock for the first spoke.

12. The computer program product of claim 7, wherein the computer readable program further causes the computer to:
    determine if the size of the first spoke is less than a high threshold;
    request adding the asset to the first spoke if the size of the first spoke is less than the high threshold; and
    rotate the global spoke pointer to the second spoke if the size of the first spoke is not less than the high threshold.

13. The computer program product of claim 12, wherein the computer readable program further causes the computer to:

add the asset to the first spoke when a spoke lock for the first spoke is granted;

increment a size counter for the first spoke; and free the spoke lock for the first spoke.

14. The computer program product of claim 13, wherein the computer readable program further causes the computer to rotate the global spoke pointer and request adding the asset to the new current spoke if a number of global spoke pointer rotations exceeds a rotation threshold.

15. The computer program product of claim 7, wherein the computer readable program further causes the computer to transparently provide at least one requested asset to each software process that applies for an asset.

16. A system to parallelize access to assets, the system comprising:

a plurality of assets;

a computer storing a data set corresponding to each asset, wherein each data set is associated with one spoke of a plurality of spokes organized with a circular order, each spoke is organized as an asset queue, and wherein the computer comprises a size module determining if a size of a first spoke is greater than a low threshold, wherein a global spoke pointer identifies the first spoke as a current spoke and the global spoke pointer rotates through the plurality of spokes in a fixed, circular order from the first spoke to the second spoke and each of the other plurality of spokes and then back to the first spoke, wherein the plurality of spokes maintain fixed positions in the circular order;

a request module requesting an asset from the first spoke if the size of the first spoke is greater than the low threshold; and a rotate module rotating the global spoke pointer to a second spoke of the plurality of spokes if the size of the first spoke is not greater than the low threshold, wherein the second spoke becomes the current spoke.

17. The system of claim 16, wherein the assets are pages of shared memory.

18. The system of claim 16, wherein the assets are selected from processors, blade servers, storage devices, and communication channels.

19. The system of claim 16, the computer further comprising a rotation count module and the request module further requesting an asset from the current spoke if the rotation count module determines a number of global spoke pointer rotations exceeds a rotation threshold and if a size of the current spoke is not empty.

20. A method for deploying computer infrastructure, comprising storing computer-readable code in a non-transitory storage device, wherein the code when executed on a computing system performs the following:

determining if a size of a first spoke of a plurality of spokes organized with a circular order is greater than a low threshold, wherein a global spoke pointer identifies the first spoke as a current spoke, the global spoke pointer rotates through the plurality of spokes in a fixed, circular order from the first spoke to a second spoke and each of the other plurality of spokes and then back to the first spoke, wherein the plurality of spokes maintain fixed positions in the circular order and each spoke is an asset queue;

requesting an asset from the first spoke if the size of the first spoke is greater than the low threshold;

rotating the global spoke pointer to the second spoke of the plurality of spokes if the size of the first spoke is not greater than the low threshold, wherein the second spoke is the current spoke;

rotating the global spoke pointer to the second spoke if the size of the first spoke is greater than the low threshold and if a spoke lock for the first spoke is not granted in response to the request; and requesting an asset from the current spoke if a number of global spoke pointer rotations exceeds a rotation threshold and if a size of the current spoke is not empty.

* * * * *